United States Patent
Uchida et al.

(10) Patent No.: US 12,542,015 B2
(45) Date of Patent: Feb. 3, 2026

(54) BATTERY ELECTRIC VEHICLE

(71) Applicant: TOYOTA JIDOSHA KABUSHIKI KAISHA, Toyota (JP)

(72) Inventors: Takahiro Uchida, Kasugai (JP); Seiji Arakawa, Nisshin (JP); Kazuhito Sakai, Mishima (JP); Chie Fukuhara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/917,756

(22) Filed: Oct. 16, 2024

(65) Prior Publication Data
US 2025/0131779 A1  Apr. 24, 2025

(51) Int. Cl.
*G06F 17/00* (2019.01)
*B60L 15/20* (2006.01)
*B60L 50/60* (2019.01)
*B60L 58/12* (2019.01)
*G07C 5/08* (2006.01)
*G10K 15/04* (2006.01)

(52) U.S. Cl.
CPC ............ *G07C 5/0833* (2013.01); *B60L 15/20* (2013.01); *B60L 50/60* (2019.02); *B60L 58/12* (2019.02); *G10K 15/04* (2013.01)

(58) Field of Classification Search
CPC ....... G07C 5/0833; B60L 15/20; B60L 50/60; B60L 58/12; G10K 15/04
USPC .......................................................... 701/22
See application file for complete search history.

(56) References Cited

U.S. PATENT DOCUMENTS

| | | | |
|---|---|---|---|
| 10,324,683 B2 * | 6/2019 | Winton | H03G 3/32 |
| 10,786,033 B2 * | 9/2020 | Brown | A42B 3/042 |
| 11,850,904 B2 * | 12/2023 | Anderson | B60G 17/016 |
| 12,145,503 B2 * | 11/2024 | Duo' | B60L 7/18 |
| 2014/0214242 A1 | 7/2014 | Seo et al. | |
| 2015/0199955 A1 * | 7/2015 | Draganic | G08B 6/00 381/86 |
| 2016/0068101 A1 | 3/2016 | Holloway et al. | |
| 2018/0181365 A1 * | 6/2018 | Winton | G06F 3/04845 |

(Continued)

FOREIGN PATENT DOCUMENTS

| | | | |
|---|---|---|---|
| DE | 102020215839 A1 * | 6/2021 | B60R 16/0232 |
| JP | 2011-213273 A | 10/2011 | |

(Continued)

OTHER PUBLICATIONS

Sound design and testing for electric and hybrid vehicles (Year: 2019).*

*Primary Examiner* — Ronnie M Mancho
(74) *Attorney, Agent, or Firm* — Finnegan, Henderson, Farabow, Garrett, and Dunner, LLP

(57) ABSTRACT

A battery electric vehicle that uses an electric motor as a traction power unit includes one or more speakers that output sound to at least one of inside and outside of the vehicle, one or more processors, and one or more storage devices for storing usage state information of the electric vehicle and sound source data. The one or more processors estimate fitness of the battery electric vehicle based on the usage state information. The one or more processors generate, based on the sound source data, a sound in accordance with the fitness. The one or more processors are configured to output the generated sound through the one or more speakers.

11 Claims, 9 Drawing Sheets

(56) References Cited

U.S. PATENT DOCUMENTS

| | | | |
|---|---|---|---|
| 2021/0068490 A1* | 3/2021 | Stolarz | A42B 3/042 |
| 2021/0125420 A1 | 4/2021 | Tabata et al. | |
| 2022/0041070 A1 | 2/2022 | Isami et al. | |
| 2022/0063494 A1* | 3/2022 | Duo' | B60L 7/18 |
| 2022/0126640 A1* | 4/2022 | Anderson | B60K 35/10 |

FOREIGN PATENT DOCUMENTS

| | | |
|---|---|---|
| JP | 2014-240239 A | 12/2014 |
| JP | 5966121 B2 | 8/2016 |
| JP | 2022-030862 A | 2/2022 |
| KR | 10-1998-0015207 A | 5/1998 |
| KR | 10-2009-0121986 A | 11/2009 |
| KR | 10-2013-0026214 A | 3/2013 |
| KR | 10-2014-0097806 A | 8/2014 |
| KR | 10-2020-0104447 A | 9/2020 |

\* cited by examiner

FIG. 2
| FITNESS | GENERATED SOUND | |
|---|---|---|
| 5 | SOUND INDICATING THAT FIT |  |
| 4 | SOUND INDICATING THAT SOMEWHAT FIT | ... |
| 3 | SOUND INDICATING THAT NORMAL |  |
| 2 | SOUND INDICATING THAT SOMEWHAT UNFIT | ... |
| 1 | SOUND INDICATING THAT UNFIT |  |

BATTERY ELECTRIC VEHICLE

CROSS-REFERENCE TO RELATED APPLICATION

This application claims priority to Japanese Patent Application No. 2023-182434 filed on Oct. 24, 2023, incorporated herein by reference in its entirety.

BACKGROUND

1. Technical Field

The present disclosure relates to a battery electric vehicle using an electric motor as a traction power unit.

2. Description of Related Art

Japanese Patent Application Publication No. 2011-213273 (JP 2011-213273 A) discloses technology for controlling in-vehicle virtual engine sound to be generated inside of a vehicle and an extra-vehicle virtual engine sound to be generated outside of the vehicle. In this related art, control is performed to change the in-vehicle virtual engine sound and the extra-vehicle virtual engine sound so as to be different from each other, based on given information.

SUMMARY

However, some drivers do not use battery electric vehicles appropriately, such as hardly ever driving their personal vehicles (battery electric vehicles) or the like. In such cases, the battery electric vehicle may point out to the driver that a usage state of the battery electric vehicle is not favorable. On the other hand, when the usage state of the battery electric vehicle is good, the electric vehicle may point this out to the driver.

The present disclosure provides technology that can prompt appropriate use of battery electric vehicles.

One aspect of the present disclosure relates to a battery electric vehicle using an electric motor as a traction power unit. The electric vehicle is equipped with one or more speakers that output sound to at least one of inside and outside of the vehicle, one or more processors, and one or more storage devices for storing usage state information of the battery electric vehicle and sound source data. The one or more processors are configured to estimate a fitness of the battery electric vehicle based on the usage state information. The one or more processors generate, based on the sound source data, sound in accordance with the fitness. The one or more processors are configured to output the generated sound through the one or more speakers.

According to the present disclosure, the fitness of the battery electric vehicle is estimated based on the usage state of the battery electric vehicle. Sound corresponding to the fitness is then generated using the sound source data, and the generated sound is output from the speakers. This enables the driver to be informed regarding whether the battery electric vehicle is in a fit or unfit state. Thus, it is anticipated that appropriate use of the battery electric vehicle will be promoted, and that fondness of the battery electric vehicle will further increase.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is a diagram for describing a specific example of generated sounds according to the embodiment;

DETAILED DESCRIPTION OF EMBODIMENTS

A battery electric vehicle according to an embodiment of the present disclosure will be described with reference to the accompanying drawings. Elements common to each figure are denoted by the same reference signs, and repetitive descriptions will be omitted.

1. Overview

Figure 1:
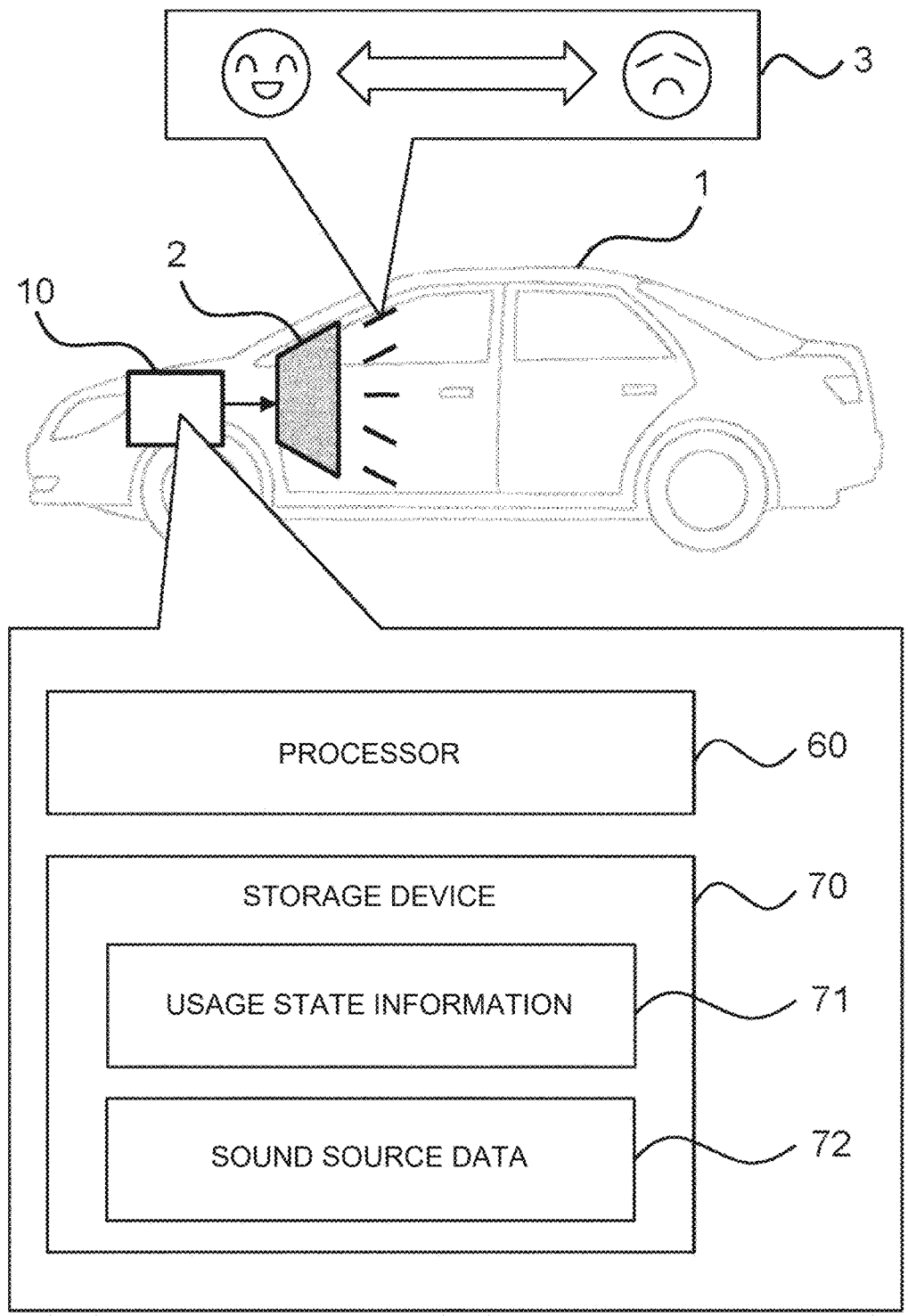
FIG. 1 is a diagram for describing an overview of a battery electric vehicle according to an embodiment.

FIG. 1 is a diagram for describing an overview of a battery electric vehicle 1 (hereinafter referred to simply as "vehicle 1") according to an embodiment. The vehicle 1 uses an electric motor as a traction power unit. A configuration of a motive power control system of the vehicle 1 will be described in detail later.

As illustrated in FIG. 1, the vehicle 1 includes one or more speakers 2 (hereinafter referred to simply as "speaker 2") and an information processing device 10. The speaker 2 outputs sound to at least one of inside and outside of the vehicle. That is to say, the speaker 2 may include an in-vehicle speaker and an extra-vehicle speaker. The in-vehicle speaker may be the same as a built-in speaker that outputs audio for navigation, or the like, or may be an add-on speaker. Also, in-vehicle speakers may be disposed so as to create a stereophonic sound effect.

The speaker 2 may be configured to be capable of Near Field Communication such as Bluetooth (registered trademark) or the like.

The information processing device 10 is connected to the speaker 2 and generates sounds to be output from the speaker 2. The information processing device 10 is, for example, an electronic control unit (ECU), a tablet PC, or the like. The information processing device 10 includes one or more processors 60 (hereinafter simply referred to as "processor 60") and one or more storage devices 70 (hereinafter simply referred to as "storage device 70"). The processor 60 executes various types of processing. An example of the processor 60 is a central processing unit (CPU). The storage device 70 stores various types of information required for processing by the processor 60. Examples of the storage device 70 include volatile memory, nonvolatile memory, a hard disk drive (HDD), a solid state drive (SSD), or the like.

A sound generating program (omitted from illustration) is a computer program executed by the processor 60. The processor 60 may execute the sound generating program to realize various functions of the information processing device 10. The sound generating program is stored in the storage device 70. Alternatively, the sound generating program may be recorded in a computer-readable storage medium.

Various types of information stored in the storage device 70 includes usage state information 71 and sound source data 72.

The usage state information 71 indicates a usage state of the vehicle 1. More specifically, the usage state information 71 includes various types of information that serve as indicators of whether the vehicle 1 is being used appropriately. Whether the vehicle 1 is being used appropriately varies from moment to moment. For this reason, the usage state information 71 is updated periodically. The various types of information included in the usage state information 71 will be described in detail later.

The sound source data 72 is used to generate the sound to be output from the speaker 2. The information processing device 10 generates sound based on the sound source data 72, and outputs the generated sound from the speaker 2.

As an example, a case will be considered in which a mimic engine sound is output from the speaker 2 in the battery electric vehicle 1. In this case, a plurality of types of basic sound source data for generating the mimic engine sound is prepared as the sound source data 72. The types of basic sound source data include, for example, sound source data of sounds caused by engine combustion (for low rotational speed, for mid-range rotational speed, and for high rotational speed), sound source data of sounds caused by the drive system such as gears and so forth (for low rotational speed, for mid-range rotational speed, and for high rotational speed), sound source data of noise sounds, sound source data of event sounds, and so forth. Also, the information processing device 10 acquires information regarding the driving state of the vehicle 1. The driving state of the vehicle 1 may be exemplified by rotational speed of a virtual engine, traveling speed, and so forth. Rotational speed of the virtual engine is the rotational speed of the virtual engine when assuming that the battery electric vehicle 1 is being driven by the virtual engine. For example, the rotational speed of the virtual engine is calculated based on the rotational speed of the wheels, an overall reduction ratio, and a slip ratio of a virtual clutch. The traveling speed is detected by a sensor installed in the vehicle 1. The information processing device 10 generates the mimic engine sound in accordance with the driving state of the vehicle 1 by combining one or more pieces of basic sound source data. Note that the method of generating the mimic engine sound is not limited in particular. For example, the mimic engine sound may be generated by a known mimic engine sound simulator used in videogames or the like. Also, the type of engine vehicle of which the engine sound is to be simulated may be specified by a driver.

Note that the sound output from the speaker 2 is not limited to the mimic engine sound. For example, tunes, navigation audio, and so forth, may be output from the speaker 2. In the case of a tune, the sound source data 72 includes sound source data of the tune, and the information processing device outputs the tune from the speaker 2 based on the sound source data of the tune. In the case of the navigation audio, the sound source data 72 includes sound source data for the navigation audio, and the information processing device outputs the navigation audio from the speaker 2 based on the sound source data for the navigation audio.

The information processing device 10 may add new sound source data 72 or delete unnecessary sound source data 72. The information processing device 10 may include a communication device (omitted from illustration) that is capable of external communication such that the sound source data 72 can be externally operated.

An overview of sound generating processing by the processor 60 (information processing device 10) in accordance with the present embodiment is as follows. The processor 60 estimates a fitness of the vehicle 1, based on the usage state information 71. In this specification, "fitness of the vehicle" means "the degree indicating how good the condition of the vehicle is". The processor 60 then generates a sound in accordance with the fitness, based on the sound source data 72. The generated sound is referred to as "generated sound 3". Further, the processor 60 outputs the generated sound 3 through the speaker 2.

According to this embodiment, the fitness of the vehicle 1 is estimated based on the usage state of the vehicle 1. A sound corresponding to the fitness is then generated using the sound source data 72, and the generated sound 3 is output from the speaker 2. This enables the driver to be informed whether the vehicle 1 is in a fit or unfit state. Thus, it is anticipated that appropriate use of the vehicle 1 will be promoted and that fondness of the vehicle 1 will be further increased.

2. Specific Example 2-1. Examples of Generated Sound

FIG. 2 is a diagram for describing a specific example of generated sounds 3 according to the embodiment. In the example shown in FIG. 2, when the fitness is "5", the information processing device 10 generates, as generated sound 3, a sound indicating that the vehicle is in a fit state. When the fitness is "4", the information processing device 10 generates, as generated sound 3, a sound indicating that the vehicle is in a somewhat fit state. When the fitness is "3", the information processing device 10 generates, as generated sound 3, a sound indicating that the vehicle is in a normal state. When the fitness is "2", the information processing device 10 generates, as generated sound 3, a sound indicating that the vehicle is in a somewhat unfit state. When the fitness is "1", the information processing device 10 generates, as generated sound 3, a sound indicating that the vehicle is in an unfit state.

There are various conceivable techniques for reflecting the fitness in the generated sound 3. In other words, there are various conceivable techniques for expressing the fitness through sound.

As a first example, the fitness can be expressed by sound pressure of the sound. In particular, when the sound pressure is low, the sound becomes muffled and dull. Conversely, when the sound pressure is high, the sound becomes clearer and more energetic. Accordingly, increasing the sound pressure of the generated sound 3 enables the information processing device 10 to express that the vehicle 1 is fit. Conversely, reducing the sound pressure of the generated sound 3 enables the information processing device 10 to express that the vehicle 1 is unfit. Thus, the information processing device 10 raises the sound pressure of the generated sound 3, the higher the fitness is. For example, the information processing device 10 can raise the sound pressure of the sound source data 72 read from the storage device 70, thereby raising the sound pressure of the generated sound 3 generated based on the sound source data 72.

As a second example, the fitness can be expressed by frequency of the sound. Specifically, as the frequency becomes lower, the sound becomes darker and heavier. Conversely, as the frequency becomes higher, the sound becomes brighter and lighter. Accordingly, raising the frequency of the generated sound 3 enables the information processing device 10 to express that the vehicle 1 is fit. Conversely, lowering the frequency of the generated sound 3 enables the information processing device 10 to express that the vehicle 1 is unfit. Thus, the information processing device 10 raises the frequency of the generated sound 3, the higher the fitness is. For example, the information processing device 10 can raise the frequency of the sound source data 72 read from the storage device 70, thereby raising the frequency of the generated sound 3 generated based on the sound source data 72.

As a third example, a plurality of patterns of sound source data 72 with different brightness of tone may be prepared in advance. The information processing device 10 selects the sound source data 72 with a brighter tone from among the patterns of sound source data 72, the higher the fitness of the vehicle 1 is. Conversely, the information processing device 10 selects the sound source data 72 with a darker tone from among the patterns of sound source data 72, the lower the fitness of the vehicle 1 is. The information processing device 10 then generates a sound based on the sound source data 72 that is selected.

Figure 3:
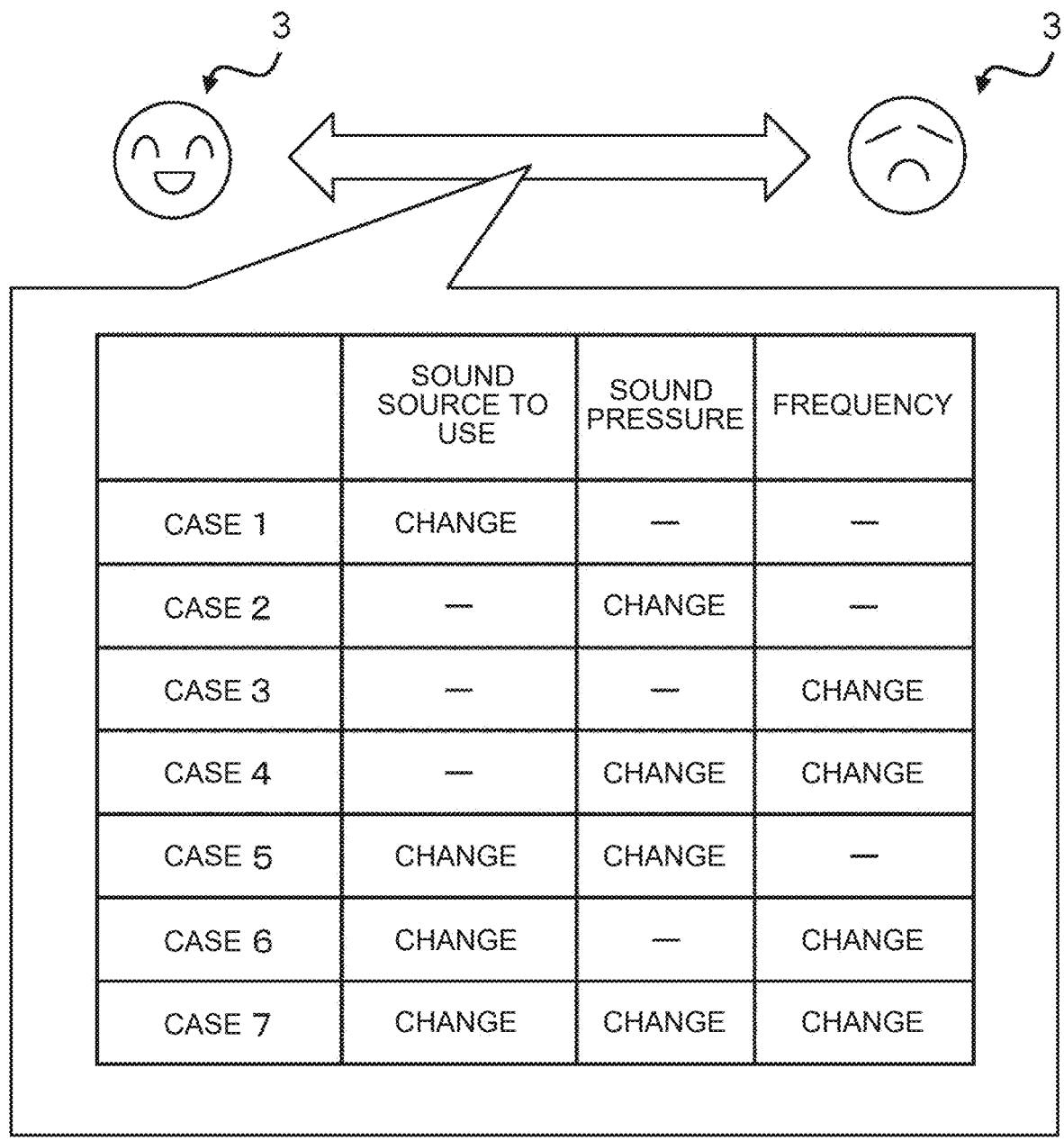
FIG. 3 is a diagram for describing a specific example of generated sounds according to the embodiment.

A combination of two or more of the above first to third examples can also be made. That is to say, the information processing device 10 adjusts at least one of the sound pressure, the frequency, and the sound source data to be used, depending on the fitness. As shown in FIG. 3, there are seven combinations of parameters for varying the generated sound 3, from case 1 to case 7.

2-2. Examples of Usage States of Vehicle

As described above, the usage state of the vehicle 1 indicates an index showing whether the vehicle 1 is being used appropriately. The usage state of the vehicle 1 is made up of at least one of frequency of use of the vehicle 1, frequency of cleaning of the vehicle 1, cleanliness of the vehicle 1, adequacy of maintenance and management of the vehicle 1, driving duration of the vehicle 1, and amount of charge of a battery. Each element making up the usage state of the vehicle 1 will be described in detail below.

2-2-1. First Example

Figure 4:
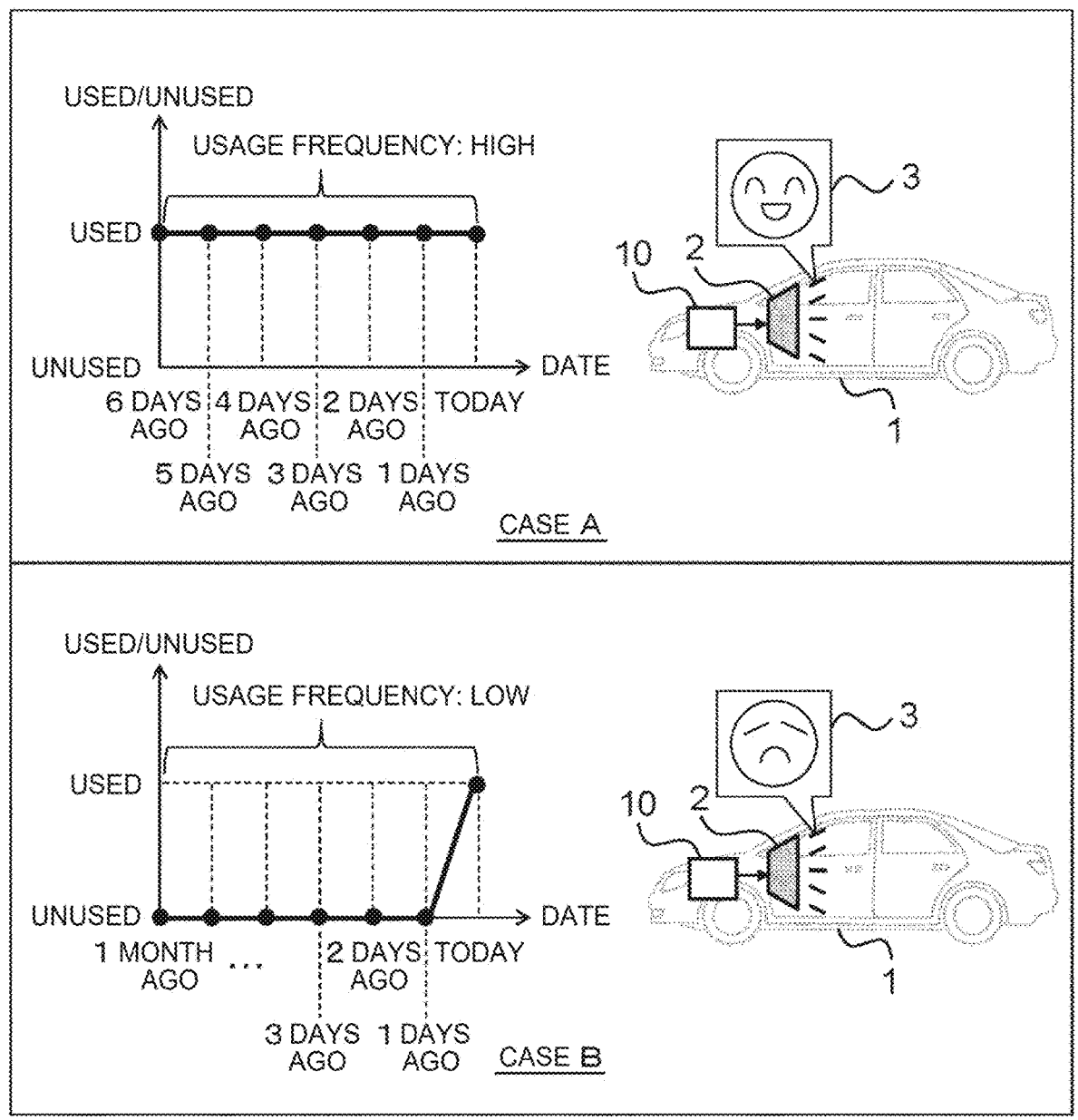
FIG. 4 is a diagram for describing a specific example of usage states according to the embodiment.

FIG. 4 is a diagram for describing a specific example of the frequency of use of the vehicle 1. The frequency of use of the vehicle 1 is calculated based on at least one of the number of times the vehicle 1 is used and duration of use. The number of times the vehicle 1 is used may be counted just once even if the vehicle is used multiple times in one day, or may be counted for the number of times the vehicle is used. For example, as shown in case A in FIG. 4, when the number of times the vehicle 1 is used is counted just once a day, and also the number of times the vehicle 1 is used in one week (seven days) is seven times, the information processing device 10 judges that the frequency of use of the vehicle 1 is high, and estimates that the fitness of the vehicle 1 is also high. In this case, a sound indicating that the vehicle is in a fit state is output from the speaker 2 as the generated sound 3.

On the other hand, as shown in case B in FIG. 4, when the number of times the vehicle 1 is used is counted just once a day, and also the number of times the vehicle 1 is used is once a month, the information processing device 10 judges that the frequency of use of the vehicle 1 is low and estimates that the fitness of the vehicle 1 is also low. In this case, a sound indicating that the vehicle is in an unfit state is output from the speaker 2 as the generated sound 3.

Thus, when the usage state of the vehicle 1 is the frequency of use of the vehicle 1, the higher the frequency of use of the vehicle 1 is, the higher the fitness of the vehicle 1 is, and the lower the frequency of use of the vehicle 1 is, the lower the fitness of the vehicle 1 is. This enables a sound that corresponds to the frequency of use of the vehicle 1 to be generated as a generated sound 3. When the frequency of use is low, a generated sound 3 that indicates that the vehicle is in an unfit state is output. Accordingly, the driver can be informed of the state of the vehicle 1, and it is anticipated that the frequency of use of the vehicle 1 will further increase. Also, when a troublesome generated sound 3 is output from the speaker 2 when the frequency of use of the vehicle 1 is low, it may seem as if the vehicle 1 is sulking when the frequency of use is low. It is anticipated that such "human-like" behavior of the vehicle 1 will further increase the driver's fondness of the vehicle 1.

2-2-2. Second Example

The frequency of cleaning the vehicle 1 is calculated based on at least one of the number of times the vehicle 1 is cleaned, and the duration of cleaning. The number of times that the vehicle 1 is cleaned may be counted, for example, when a sign prompting the driver to change engine oil is displayed on a dashboard and the display is reset after the engine oil is changed, or when the air conditioner settings are reset when the air conditioner is not working well. In this case, status information indicating resetting is input to the information processing device 10. As another example, the number of times the vehicle 1 is cleaned may be counted based on recognition information obtained by an in-vehicle camera that shoots images of the interior of the vehicle. Specifically, when image processing based on camera images from an in-vehicle camera recognizes that a person such as a driver is cleaning, the information processing device 10 may enable a mode for counting the number of times of cleaning and count the number of times of cleaning. The cleaning duration of the vehicle 1 may be, for example, a time period during which this mode is active. The number of times the vehicle 1 is cleaned may be counted just once a day, as in the case of the number of times the vehicle 1 is used as described above, or may be counted for the number of times the vehicle 1 is cleaned.

For example, when the number of times of cleaning the vehicle 1 is no less than a predetermined number, the information processing device 10 judges that the cleaning frequency of the vehicle 1 is high, and estimates that the fitness of the vehicle 1 is also high. In this case, a sound indicating that the vehicle is in a fit state is output from the speaker 2 as the generated sound 3. On the other hand, when the number of times of cleaning the vehicle 1 is less than the predetermined number, the information processing device 10 judges that the cleaning frequency of the vehicle 1 is low, and estimates that the fitness of the vehicle 1 is also low. In this case, a sound indicating that the vehicle is in an unfit state is output from the speaker 2 as the generated sound 3.

Thus, when the usage state of the vehicle 1 is the frequency of cleaning the vehicle 1, the higher the frequency of cleaning of the vehicle 1 is, the higher the fitness of the vehicle 1 is, and the lower the frequency of cleaning the vehicle 1 is, the lower the fitness of the vehicle 1 is. This enables a sound that corresponds to the frequency of cleaning of the vehicle 1 to be generated as the generated sound 3. When the frequency of cleaning is low, a generated sound 3 that indicates that the vehicle is in an unfit state is output. Accordingly, the driver can be informed of the state of the vehicle 1, and it is anticipated that the frequency of cleaning of the vehicle 1 will further increase. Also, when a troublesome generated sound 3 is output from the speaker 2 when the cleaning frequency of the vehicle 1 is low, it may seem as if the vehicle 1 is grumpy when the cleaning frequency is low. It is anticipated that such "human-like" behavior of the vehicle 1 will further increase the driver's fondness of the vehicle 1.

2-2-3. Third Example

Cleanliness of the vehicle 1 indicates messiness of the vehicle 1. The messiness of the vehicle 1 is determined, for example, based on sensor information acquired by an in-vehicle sensor. Examples of in-vehicle sensors include an in-vehicle camera that shoots images of inside of the vehicle, an exterior camera that shoots images of outside of the vehicle, and an odor sensor that detects odors inside the vehicle, and so forth. The sensor information obtained by the in-vehicle sensor is input to the information processing device 10.

For example, when image processing based on camera images shot by an in-vehicle camera recognizes that trash or the like is scattered inside the vehicle, the information processing device 10 determines that the messiness of the vehicle 1 is high, i.e., the cleanliness is low. As another example, when image processing based on camera images from an exterior camera recognizes that there is dirt on the surface of the vehicle body, the information processing device 10 determines that the messiness of the vehicle 1 is high, i.e., the cleanliness of the vehicle 1 is low. As yet another example, when the odor level detected by the odor sensor is recognized as being an abnormal odor level, the information processing device 10 determines that the messiness of the vehicle 1 is high, i.e., the cleanliness of the vehicle 1 is low. In these cases, the information processing device 10 determines that the fitness of the vehicle 1 is low, and outputs a sound indicating that the vehicle is in an unfit state from the speaker 2 as the generated sound 3.

On the other hand, when the messiness of the vehicle 1 is determined to be low, i.e., the cleanliness of the vehicle 1 is determined to be high, the information processing device 10 determines that the fitness of the vehicle 1 is high, and a sound indicating that the vehicle is in a fit state is output from speaker 2 as the generated sound 3.

The cleanliness may also be estimated based on the cleaning frequency described in the second example above. That is to say, the higher the cleaning frequency is, the higher the cleanliness may be estimated to be, and the lower the cleaning frequency is, the lower the cleanliness may be estimated to be.

Thus, when the usage state of the vehicle 1 is the cleanliness of the vehicle 1, the higher the cleanliness of the vehicle 1 is, the higher the fitness of the vehicle 1 is, and the lower the cleanliness of the vehicle 1 is, the lower the fitness of the vehicle 1 is. This enables a sound that corresponds to the cleanliness of the vehicle 1 to be generated as the generated sound 3. Accordingly, the driver can be informed of the state of the vehicle 1, and it is anticipated that the cleanliness of the vehicle 1 will further increase. Also, when a troublesome generated sound 3 is output from the speaker 2 when the cleanliness of the vehicle 1 is low, it may seem as if the vehicle 1 is grumpy when the cleanliness is low. It is anticipated that such "human-like" behavior of the vehicle 1 will further increase the driver's fondness of the vehicle 1.

2-2-4. Fourth Example

Adequacy of maintenance of the vehicle 1 indicates the degree to which the vehicle 1 is appropriately maintained. Maintenance of the vehicle 1 includes at least one of compliance with vehicle inspection schedules and remedying trouble issues. For example, when the vehicle inspection schedule is past due date, the information processing device 10 determines that the adequacy of maintenance is low. Information regarding the vehicle inspection schedule may be stored in the storage device 70 in advance. As another example, when trouble in the vehicle 1 is left unattended, the information processing device 10 determines that the adequacy of maintenance is low. Whether there is trouble in the vehicle 1 may be determined, for example, based on abnormality information that is notified to the driver when an abnormality in the vehicle 1 is detected. The abnormality information of the vehicle 1 is stored in the storage device 70. In these cases, the information processing device 10 determines that the fitness of the vehicle 1 is low, and outputs a sound indicating that the vehicle is in an unfit state from the speaker 2 as the generated sound 3. On the other hand, when determination is made that the adequacy of maintenance of the vehicle 1 is high, the information processing device 10 determines that the fitness of the vehicle 1 is high, and outputs a sound indicating that the vehicle is in a fit state from the speaker 2 as the generated sound 3.

In this way, when the usage state of the vehicle 1 is the adequacy of maintenance of the vehicle 1, the higher the adequacy of maintenance of the vehicle 1 is, the higher the fitness of the vehicle 1 is, and the lower the adequacy of maintenance of the vehicle 1 is, the lower the fitness of the vehicle 1 is. This enables a sound that corresponds to the adequacy of maintenance of the vehicle 1 to be generated as the generated sound 3. Therefore, the driver can be informed of the state of the vehicle 1, which leads to promoting vehicle inspection and remedying trouble issues. Thus, it is anticipated that adequacy of maintenance of the vehicle 1 will be further improved.

2-2-5. Fifth Example

Figure 5:
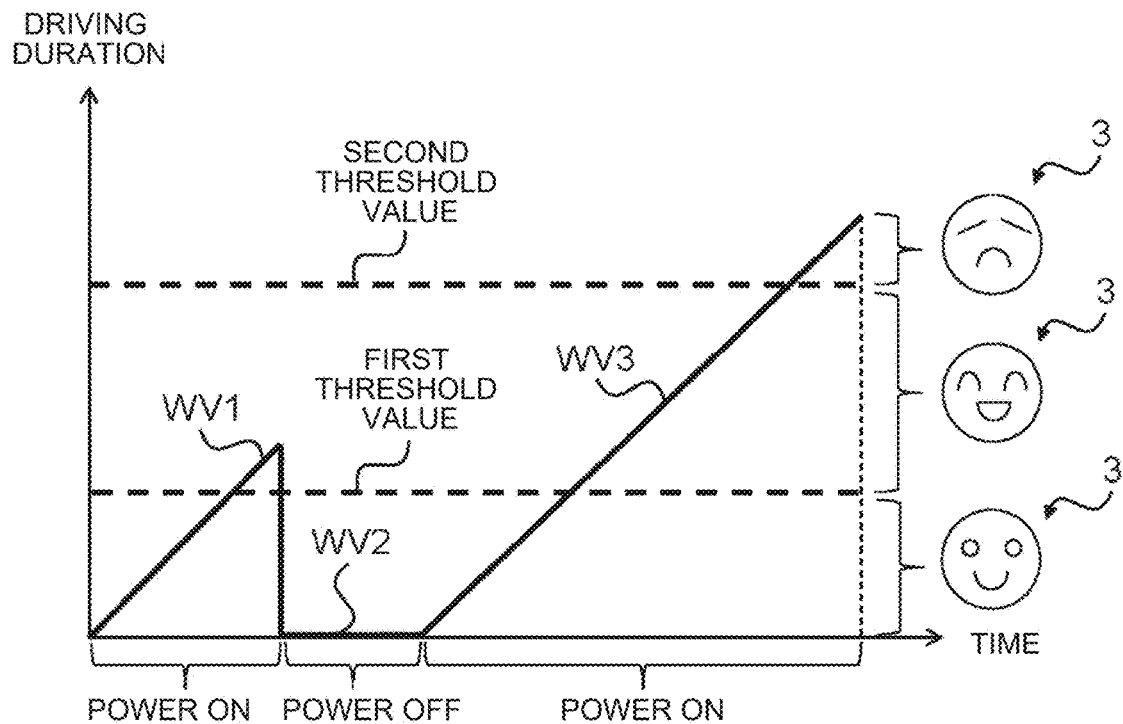
FIG. 5 is a diagram for describing a specific example of usage states according to the embodiment.

FIG. 5 is a diagram for describing a specific example of driving duration of the vehicle 1. The horizontal axis in FIG. 5 represents time, and the vertical axis represents the driving duration of the vehicle 1. The driving duration of the vehicle 1 increases when the power supply of the vehicle 1 is in an on state, for example, as indicated by a first waveform WV1 and a third waveform WV3 in FIG. 5. On the other hand, as indicated by a second waveform WV2 in FIG. 5, when the power supply of the vehicle 1 is in an off state, the driving duration of the vehicle 1 is zero. Note that power on means that the ignition is on.

For example, in the example shown in FIG. 5, a first threshold value and a second threshold value greater than the first threshold value are set for the driving duration. The first threshold value is, for example, several minutes. The second threshold value is, for example, a time period that is generally considered to be a long driving period. When the driving duration is no lower than the first threshold value and also lower than the second threshold value that is higher than the first threshold value, determination is made that the vehicle 1 has been driven continuously for a certain period of time. In this case, the information processing device 10 judges that the driving duration is appropriate, and estimates that the fitness of the vehicle 1 is high. A sound indicating that the vehicle is in a fit state is then output from the speaker 2 as the generated sound 3.

When the driving duration is no lower than the second threshold value, the vehicle 1 has been driven for a long time, and accordingly the information processing device 10 judges that the driving duration is not appropriate and estimates that the fitness of the vehicle 1 is low. In this case, a sound indicating that the vehicle is in an unfit state is output from the speaker 2 as the generated sound 3.

Note that when the driving duration is lower than the first threshold value, the information processing device 10 may judge that the driving duration is short, and estimate that the fitness of the vehicle 1 is normal. In this case, a sound indicating that the vehicle is in a normal state is output from the speaker 2 as the generated sound 3.

As a modification, the information processing device 10 may reduce the fitness of the vehicle 1 as the driving duration becomes longer. In this case as well, when the vehicle 1 is driven for a long period of time, a sound indicating that the vehicle is in an unfit state is output from the speaker 2 as the generated sound 3.

Thus, when the usage state of the vehicle 1 is the driving duration of the vehicle 1, a sound corresponding to the vehicle condition indicating the state of fitness of the vehicle 1 can be generated as the generated sound 3 based on the driving duration. This enables the driver to be prompted to take a rest when the driving duration is long, thereby promoting appropriate use of the vehicle 1, and also improving the driving safety of the vehicle 1. Furthermore, when the driving duration is long and a troublesome generated sound 3 is output from the speaker 2, it may seem as if the vehicle 1 is fatigued after being driven for a long period of time. It is anticipated that such "human-like" behavior of the vehicle 1 will further increase the driver's fondness of the vehicle 1.

2-2-6. Sixth Example

Figure 6:
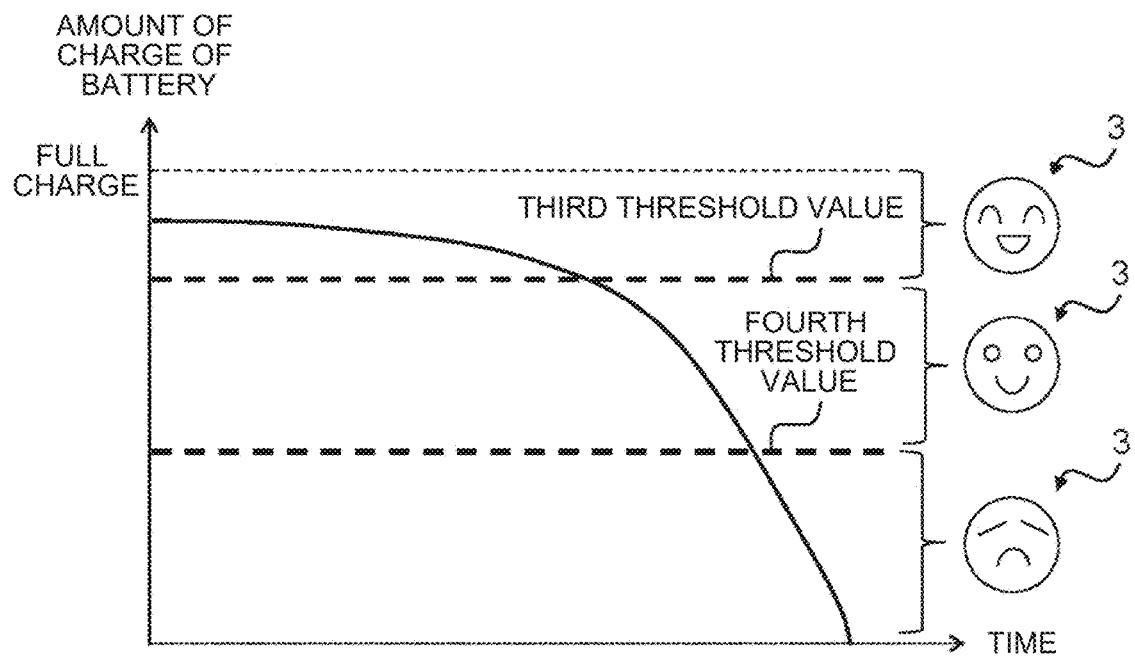
FIG. 6 is a diagram for describing a specific example of usage states according to the embodiment.

FIG. 6 is a diagram for describing a specific example of the amount of charge of the battery installed in the vehicle 1. The amount of charge of the battery (also referred to as the remaining charge of the battery) is estimated based on, for example, a state of charge (SOC). The SOC is an index that represents the charge percentage or the charged state of the battery. The SOC is calculated based on, for example, open circuit voltage (OCV) of the battery as measured by a sensor.

For example, as shown in FIG. 6, when the amount of charge of the battery is no lower than a third threshold value, i.e., when the amount of charge of the battery is close to full charge, the information processing device 10 judges that the amount of charge of the battery is appropriate, and estimates that the fitness of the vehicle 1 is high. In this case, a sound indicating that the vehicle is in a fit state is output from the speaker 2 as the generated sound 3.

As another example, when the amount of charge of the battery is lower than a fourth threshold value that is lower than the third threshold value, i.e., when the amount of charge of the battery is close to zero, the information processing device 10 judges that the amount of charge of the battery is inappropriate and estimates that the fitness of the vehicle 1 is low. In this case, a sound indicating that the vehicle is in an unfit state is output from the speaker 2 as the generated sound 3.

Note that when the amount of charge of the battery is lower than the third threshold value and also is no lower than the fourth threshold value, the amount of charge of the battery is no lower than a certain level, and accordingly the information processing device 10 may estimate that the fitness of the vehicle 1 is normal. In this case, a sound indicating that the vehicle is in a normal state is output from the speaker 2 as the generated sound 3.

In this way, when the usage state of the vehicle 1 is the amount of charge of the battery, the higher the amount of charge of the battery is, the higher the fitness of the vehicle 1 is, and the lower the amount of charge of the battery is, the lower the fitness of the vehicle 1 is. This enables a sound that corresponds to the amount of charge of the battery of the vehicle 1 to be generated as the generated sound 3. Furthermore, when the amount of charge of the battery is low, this also leads to promoting charging of the battery. Accordingly, appropriate use of the vehicle 1 is promoted. Also, when a troublesome generated sound 3 is output from the speaker 2 when the amount of charge is low, it may seem as if the vehicle 1 with a low amount of charge is languid. It is anticipated that such "human-like" behavior of the vehicle 1 will further increase the driver's fondness of the vehicle 1.

3. Processing Example

Figure 7:
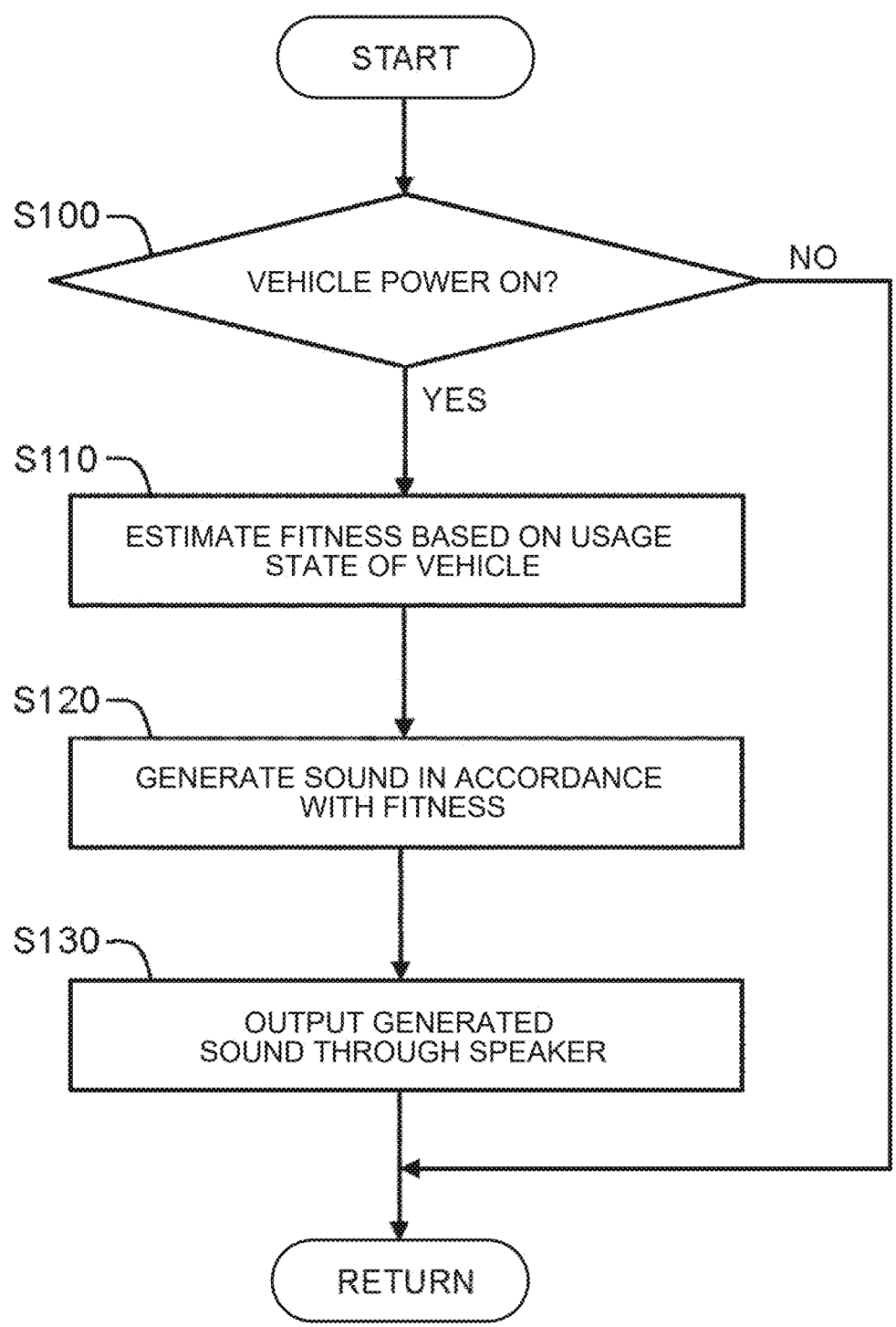
FIG. 7 is a flowchart showing an example of sound generating processing according to the embodiment.

FIG. 7 is a flowchart summarizing an example of sound generating processing according to the embodiment.

In step S100, the information processing device 10 determines whether the power supply of the vehicle 1 is on. When the power supply of the vehicle 1 is on (Yes in step S100), the processing advances to step S110. Otherwise (No in step S100), the processing ends.

In step S110, the information processing device 10 acquires the usage state information 71 indicating the usage state of the vehicle 1. The usage state information 71 includes various types of information (information regarding frequency of use of the vehicle 1, information regarding frequency of cleaning the vehicle 1, information regarding cleanliness of the vehicle 1, information regarding maintenance of the vehicle 1, information regarding the driving duration of the vehicle 1, information regarding the amount of charge of the battery, and so forth). The information processing device 10 then estimates a fitness of the vehicle 1, based on the usage state information 71. Thereafter, the processing advances to step S120.

In step S120, the information processing device 10 generates a sound in accordance with the fitness, based on the sound source data 72. Thereafter, the processing advances to step S130.

In step S130, the information processing device 10 outputs the sound that is generated (generated sound 3) through the speaker 2.

4. Configuration Example of Vehicle 4-1. First Configuration Example

Figure 8:
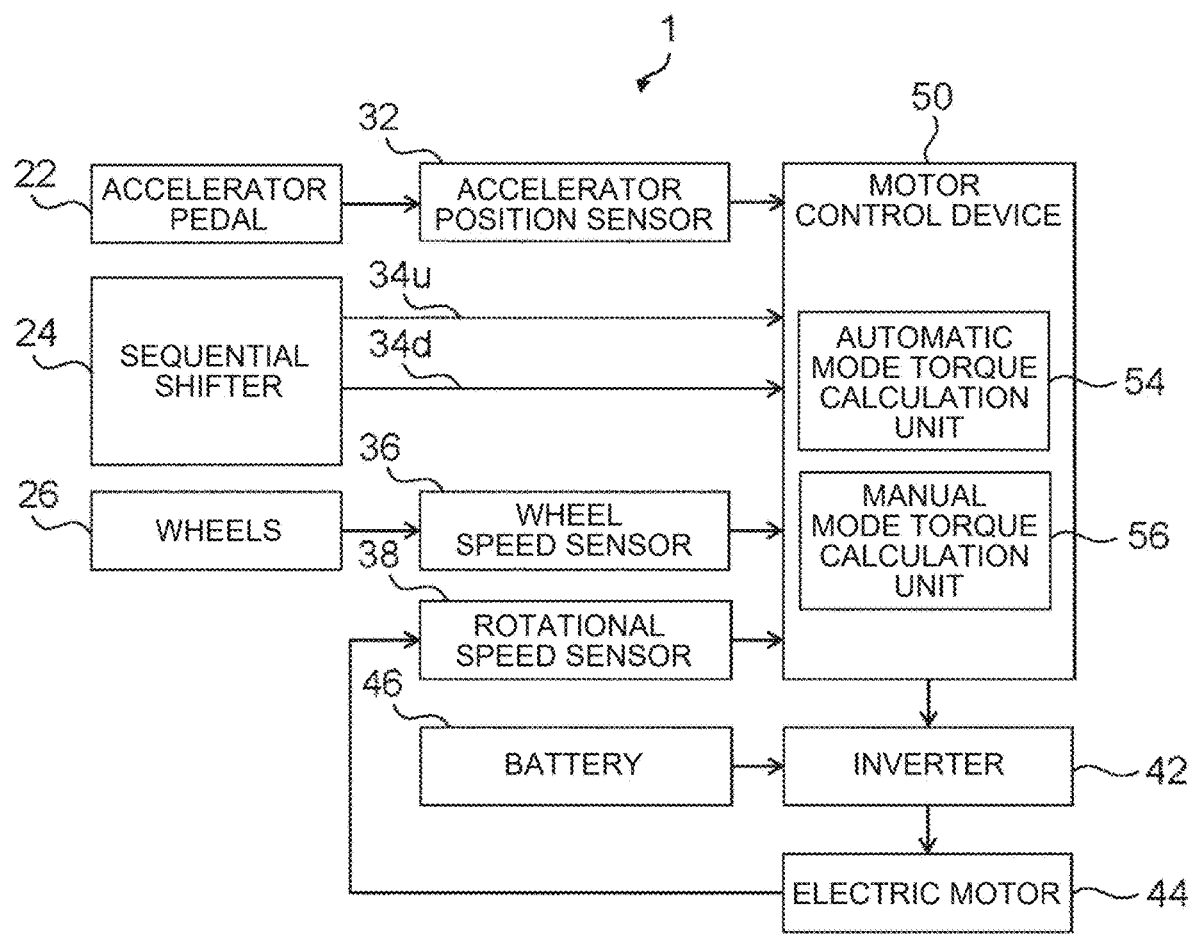
FIG. 8 is a block diagram illustrating an example of a configuration of a motive power control system of the battery electric vehicle according to the embodiment.

FIG. 8 is a block diagram illustrating a first configuration example of a motive power control system of the vehicle 1 according to the present embodiment. The vehicle 1 is equipped with an electric motor 44, a battery 46, and an inverter 42. The electric motor 44 is a traction power unit. The battery 46 stores electric energy for driving the electric motor 44. That is to say, the vehicle 1 is a battery electric vehicle (BEV) that travels on electrical energy stored in the battery 46. The inverter 42 converts direct current electric power input from the battery 46 at the time of acceleration into driving electric power of the electric motor 44. Also, the inverter 42 converts regenerative power input from the electric motor 44 at the time of deceleration into direct current electric power and charges the battery 46.

The vehicle 1 is equipped with an accelerator pedal 22 for the driver to input an acceleration request to the vehicle 1. The accelerator pedal 22 is equipped with an accelerator position sensor 32 for detecting an accelerator operation amount.

The vehicle 1 is equipped with a sequential shifter 24. The sequential shifter 24 may be a paddle-type shifter or a lever-type pseudo shifter. The paddle-type shifter is a dummy that is different from a real paddle-type shifter. The paddle-type shifter has a structure that resembles a paddle-type shifter that a clutch pedal-less manual transmission (MT) vehicle is equipped with. The paddle-type shifter is attached to a steering wheel.

The paddle-type shifter includes an upshift switch and a downshift switch that decide the operation position. When the upshift switch is pulled to the near side, an upshift signal 34u is emitted, and when the downshift switch is pulled to the near side, a downshift signal 34d is emitted.

On the other hand, the lever-type pseudo shifter, like the paddle-type shifter, is a dummy that is different from a real shifter. The lever-type pseudo shifter has a structure that resembles a lever-type shifter that a clutch pedal-less MT vehicle is equipped with. The lever-type pseudo shifter is configured to output an upshift signal 34u when the shift lever is tilted forward, and to output a downshift signal 34d when the shift lever is tilted rearward. The lever-type pseudo shifter is connected to a motor control device 50 via an in-vehicle network.

Wheels 26 of the vehicle 1 are provided with wheel speed sensors 36. The wheel speed sensors 36 are used as vehicle speed sensors for detecting the vehicle speed of the vehicle 1. The electric motor 44 is provided with a rotational speed sensor 38 for detecting the rotational speed thereof.

The vehicle 1 is equipped with the motor control device 50. The motor control device 50 is a device that controls the electric motor 44 by pulse width modulation (PWM) control of the inverter 42. Signals are input to the motor control device 50 from the accelerator position sensor 32, the sequential shifter 24 (upshift switch and downshift switch when the sequential shifter 24 is a paddle-type shifter), the wheel speed sensors 36, and the rotational speed sensor 38. The motor control device 50 performs processing of these signals and calculates a motor torque command value to perform PWM control with respect to the inverter 42.

The motor control device 50 is an ECU installed in the vehicle 1. The motor control device 50 may be a combination of a plurality of ECUs. The motor control device 50 includes an automatic mode torque calculation unit 54 and a manual mode torque calculation unit 56. Each of the units 54, 56 may be an independent ECU, or may be an ECU function obtained by a program recorded in a storage device being executed by a processor.

Also, the motor control device 50 may be a part of the information processing device 10 or may be independent from the information processing device 10. When the motor control device 50 is provided independently of the information processing device 10, the motor control device 50 may be connected to the information processing device 10 and output information regarding the operating state of the vehicle 1, which is necessary for generating pseudo engine sound in the sound source data 72, to the information processing device 10.

The motor control device 50 has, as control modes, an automatic mode and a manual mode. The automatic mode is a normal control mode for driving the vehicle 1 as a general battery electric vehicle. The automatic mode is programmed to perform continuous varying of the output of the electric motor 44 in response to the operation of the accelerator pedal 22. On the other hand, the manual mode is a control mode for driving the vehicle 1 like an MT vehicle. The manual mode is programmed to vary the output characteristics of the electric motor 44 in response to operations of the accelerator pedal 22 in accordance with upshift operations and downshift operations with respect to the sequential shifter 24. In other words, the manual mode is a control mode in which the output of the electric motor 44 can be varied in response to driving operations of vehicle components other than the accelerator pedal 22 or the brake pedal. Note that the automatic mode is programmed to accept upshifting operations and downshifting operations as strength switching operations for regenerative braking.

The automatic mode torque calculation unit 54 has a function of calculating the motor torque when the electric motor 44 is controlled in the automatic mode. The automatic mode torque calculation unit 54 stores a motor torque command map. The motor torque command map is a map for deciding the motor torque from the accelerator operation amount and the rotational speed of the electric motor 44. Signals from the accelerator position sensor 32 and signals from the rotational speed sensor 38 are input to the parameters of the motor torque command map. The motor torque corresponding to these signals is output from the motor torque command map. Accordingly, in the automatic mode, even if the driver operates the sequential shifter 24, the operation is not reflected in the motor torque.

The manual mode torque calculation unit 56 includes a vehicle model. The vehicle model is a model for calculating drive wheel torque that would be obtained by operating the accelerator pedal 22 and the sequential shifter 24 assuming that the vehicle 1 is an MT vehicle. The manual mode torque calculation unit 56 converts the drive wheel torque calculated by the vehicle model into motor torque, using a reduction ratio from an output shaft of the electric motor 44 to the drive wheels.

Figure 9:
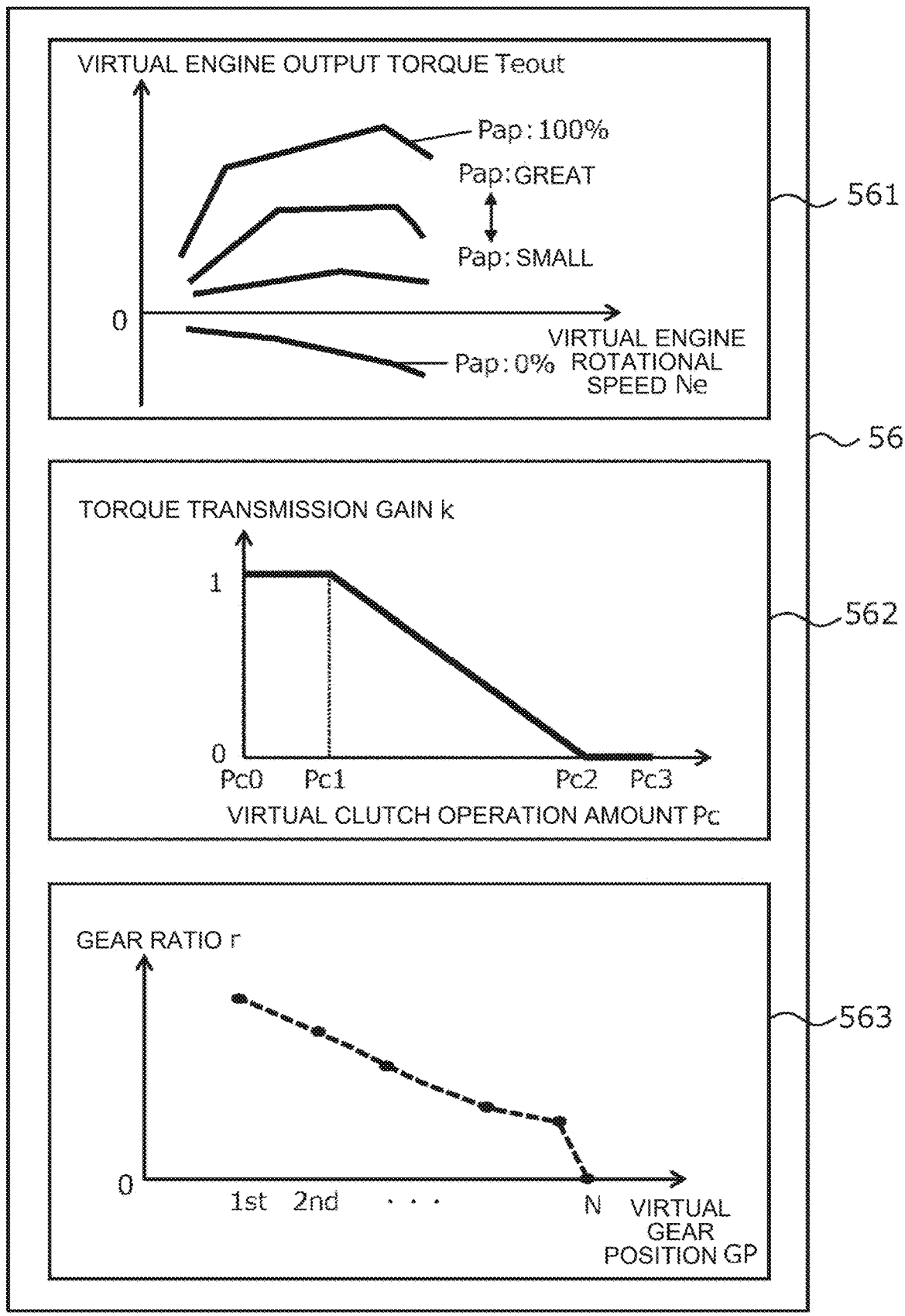
FIG. 9 is a diagram showing examples of each of an engine model, a clutch model, and a transmission model that make up a vehicle model.

The vehicle model provided in the manual mode torque calculation unit 56 will be described with reference to FIG. 9. As shown in FIG. 9, the vehicle model is made up of an engine model 561, a clutch model 562, and a transmission model 563. Note that the engine, the clutch, and the transmission virtually realized by the vehicle model are referred to as a virtual engine, a virtual clutch, and a virtual transmission, respectively. The engine model 561 models the virtual engine. The clutch model 562 models the virtual clutch. The transmission model 563 models the virtual transmission.

The engine model 561 calculates virtual engine rotational speed and virtual engine output torque. The virtual engine rotational speed is calculated from wheel speed, the overall reduction ratio, and the slip ratio of the virtual clutch. The virtual engine output torque is calculated from the virtual engine rotational speed and the accelerator operation amount. For the calculation of the virtual engine output torque, a map as shown in FIG. 9 is used which defines the relation between accelerator operation amount Pap, virtual engine rotational speed Ne, and virtual engine output torque Te-out. In this map, the virtual engine output torque Te-out with respect to the virtual engine rotational speed Ne is given for each accelerator operation amount Pap. The torque characteristics shown in FIG. 9 may be set to characteristics assumed for a gasoline engine, or may be set to characteristics assumed for a diesel engine. In addition, the torque characteristics may be set to characteristics assumed for a naturally aspirated engine, or may be set to characteristics assumed for a turbocharged engine.

The clutch model 562 calculates torque transmission gain. The torque transmission gain is a gain for calculating the degree of torque transmission of the virtual clutch in accordance with a virtual clutch operation amount. The virtual clutch operation amount is usually at 0%, and is temporarily increased to 100% in conjunction with switching of virtual gear positions of the virtual transmission. The clutch model 562 has a map such as shown in FIG. 9. In this map, torque transmission gain k is given with respect to a virtual clutch operation amount Pc. In FIG. 9, Pc0 corresponds to a position where the virtual clutch operation amount Pc is 0%, and Pc3 corresponds to a position where the virtual clutch operation amount Pc is 100%. A range from Pc0 to Pc1 and a range from Pc2 to Pc3 are dead bands in which the torque transmission gain k is unchanged, regardless of the virtual clutch operation amount Pc. The clutch model 562 calculates clutch output torque using the torque transmission gain. The clutch output torque is torque output from the virtual clutch. The clutch model 562 calculates the slip ratio. The slip ratio is used to calculate the virtual engine rotational speed in the engine model 561. The slip ratio can be calculated using a map in which the slip ratio is given with respect to the virtual clutch operation amount, in the same manner as with the torque transmission gain.

The transmission model 563 calculates a gear ratio (shift ratio). The gear ratio is a gear ratio decided by a virtual gear position in the virtual transmission. In response to an upshift operation of the sequential shifter 24, the virtual gear position is increased by one step, and in response to a downshift operation of the sequential shifter 24, the virtual gear position is decreased by one step. The transmission model 563 has a map as shown in FIG. 9. In this map, a gear ratio r is given with respect to a virtual gear position GP such that the gear ratio r decreases as the virtual gear position GP increases. The transmission model 563 calculates transmission output torque using the gear ratio and the clutch output torque obtained from the map. The transmission output torque varies non-continuously in accordance with the gear ratio being changed. This noncontinuous varying in transmission output torque generates a gear shift shock, creating a sensation of a vehicle that is equipped with a stepped transmission.

The vehicle model calculates the drive wheel torque using a predetermined reduction ratio. The reduction ratio is a fixed value that is decided by the mechanical structure from the virtual transmission to the drive wheels. Multiplying the reduction ratio by the gear ratio gives the overall reduction ratio described above. The vehicle model calculates the drive wheel torque from the transmission output torque and the reduction ratio. The motor torque in the manual mode is calculated by multiplying the drive wheel torque that is calculated by the reduction ratio from the output shaft of the electric motor 44 to the drive wheels.

4-2. Second Configuration Example

Figure 10:
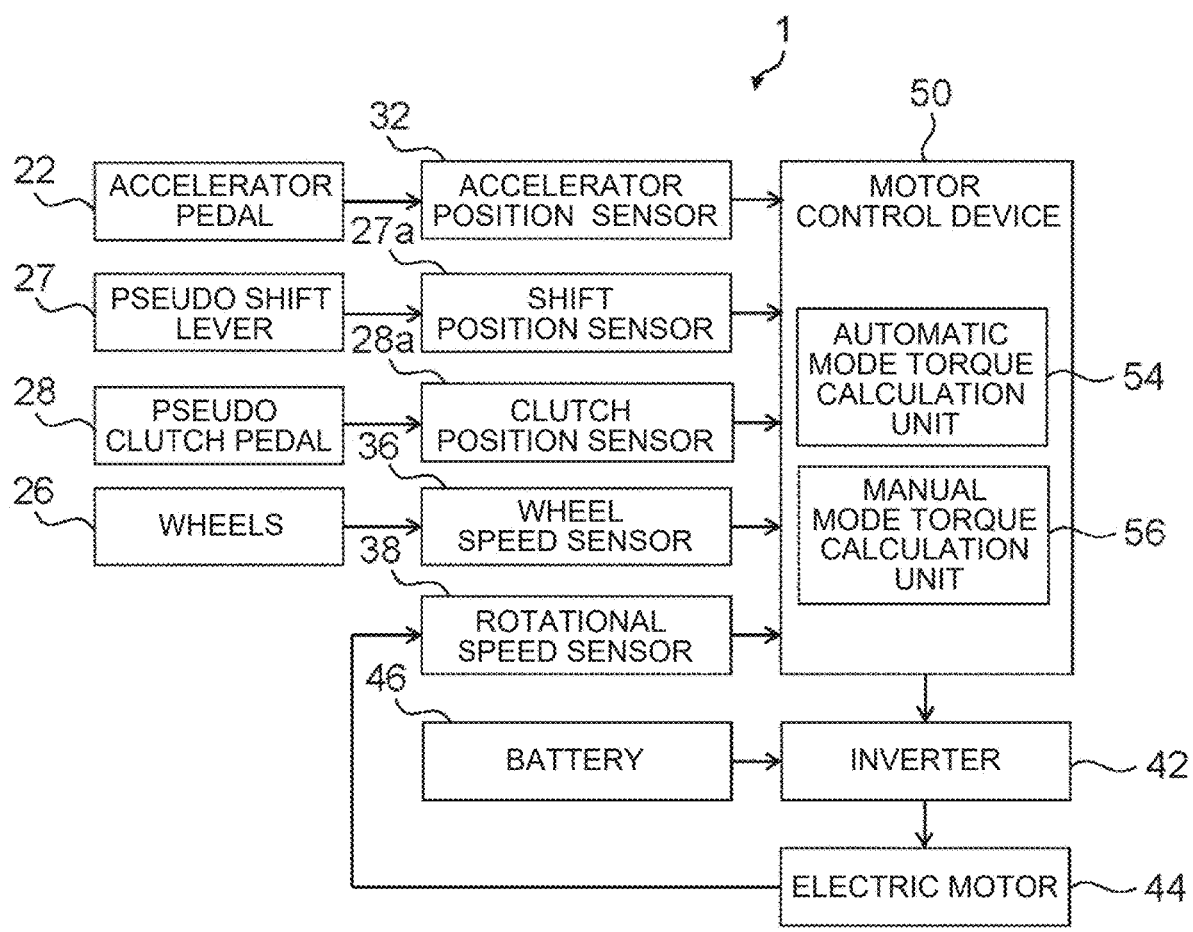
FIG. 10 is a block diagram illustrating an example of the configuration of the motive power control system of the battery electric vehicle according to the embodiment.

FIG. 10 is a block diagram illustrating a second configuration example of the motive power control system of the vehicle 1 according to the present embodiment. Here, only configurations that are different from those in the first configuration example described above will be described. Specifically, in the second configuration example, a pseudo shift lever (pseudo shift device) 27 and a pseudo clutch pedal 28 are provided instead of the sequential shifter 24 provided in the first configuration example.

A shift lever (shift device) and a clutch pedal are devices for operating an MT, but as a matter of course, the vehicle 1 is not equipped with an MT. The pseudo shift lever 27 and the pseudo clutch pedal 28 are merely dummies, and are different from a real shift lever and clutch pedal.

The pseudo shift lever 27 has a structure simulating a shift lever provided in an MT vehicle. The position and operational feel of the pseudo shift lever 27 are the same as those in an actual MT vehicle. The pseudo shift lever 27 is provided with positions corresponding to the gear positions of, for example, first gear, second gear, third gear, fourth gear, fifth gear, sixth gear, reverse, and neutral. The pseudo shift lever 27 is provided with a shift position sensor 27a that detects gear positions by distinguishing which position the pseudo shift lever 27 is in. The shift position sensor 27a is connected to the motor control device 50 via the in-vehicle network.

The pseudo clutch pedal 28 has a configuration simulating a clutch pedal that an MT vehicle is equipped with. The position and operational feel of the pseudo clutch pedal 28 are the same as those in an actual MT vehicle. When wishing to change settings of the gear position using the pseudo shift lever 27, the driver depresses the pseudo clutch pedal 28, and when changing the settings of the gear position is complete, stops depressing and returns the pseudo clutch pedal 28 to its original position. The pseudo clutch pedal 28 is provided with a clutch position sensor 28a for detecting the amount of depression of the pseudo clutch pedal 28. The clutch position sensor 28a is connected to the motor control device 50 via the in-vehicle network.

Signals from the accelerator position sensor 32, the shift position sensor 27a, the clutch position sensor 28a, the wheel speed sensors 36, and the rotational speed sensor 38, are input to the motor control device 50. The motor control device 50 performs processing of these signals and calculates a motor torque command value to perform PWM control with respect to the inverter 42.

The motor control device 50 has, as control modes, an automatic mode and a manual mode, in the same way as the first configuration example described above. The automatic mode is programmed to perform continuous varying of the output of the electric motor 44 in response to the operation of the accelerator pedal 22. On the other hand, the manual mode is a control mode for driving the vehicle 1 like an MT vehicle. The manual mode is programmed such that the output of the electric motor 44 in response to the operation of the accelerator pedal 22 is varied in accordance with the operation of the pseudo clutch pedal 28 and the pseudo shift lever (pseudo shift device) 27. In other words, the manual mode is a control mode in which the output of the electric motor 44 can be varied in response to driving operations of vehicle components other than the accelerator pedal 22 or the brake pedal.

The vehicle model provided in the manual mode torque calculation unit 56 is the same as that shown in FIG. 9. Note, however, that the virtual clutch operation amount Pc is replaced with the depression amount of the pseudo clutch pedal 28, as detected by the clutch position sensor 28a. Also, the virtual gear position GP is decided by the position of the pseudo shift lever 27 detected by the shift position sensor 27a.

5. Effects

According to the present embodiment, the fitness of the vehicle 1 is estimated based on the usage state of the vehicle 1. A sound corresponding to the fitness is then generated using the sound source data 72, and the generated sound 3 is output from the speaker 2. This enables the driver to be informed whether the vehicle 1 is in a fit or unfit state. Thus, it is anticipated that appropriate use of the vehicle 1 will be promoted and that fondness of the vehicle 1 will be further increased.

6. Modifications

6-1. Examples of Usage State

Usage states of the vehicle 1 may be an indicator of whether the manual mode is being used appropriately among the control modes. For example, the higher the frequency of use of the manual mode is, the higher the fitness of the vehicle 1 may be set to, and the lower the frequency of use of the manual mode is, the lower the fitness of the vehicle 1 may be set to. This enables the driver to be informed of whether the state of the vehicle 1 is fit or unfit, depending on the frequency of use of the manual mode. This promotes appropriate use of battery electric vehicles, which allow for enjoyment of driving in the same way as with MT vehicles.

6-2. Examples of Generated Sound

A case will be considered in which the vehicle 1 is equipped with a pseudo shift lever 27 and a pseudo clutch pedal 28, as in the second configuration example of the vehicle 1 described above. In this case, when switching the operation of the pseudo shift lever 27, the information processing device 10 may temporarily output a sound (second sound) that is different from the sound (first sound) corresponding to the usage state of the vehicle 1, as the generated sound 3 through the speaker 2. The first sound and the second sound may be from the same sound source or from different sound sources. Examples of the second sound include musical instrument sounds, animal calls, sound effects such as rattling noises, and so forth.

Further, the second sound may be different for each shift position. For example, when the pseudo shift lever 27 is shifted from first gear to second gear, the piano note "C" may be assigned as the second sound, when the pseudo shift lever 27 is shifted from second gear to third gear, the piano note "D" may be assigned as the second sound, and when the pseudo shift lever 27 is shifted from third gear to fourth gear, the piano note "E" may be assigned as the second sound.

Moreover, the second sound may be different when the pseudo shift lever 27 is upshifted and when the pseudo shift lever 27 is downshifted, even if the shift position is the same. For example, when the pseudo shift lever 27 is upshifted from first gear to second gear, the sound "moo" made by a cow may be assigned as the second sound, and when the pseudo shift lever 27 is downshifted from third gear to second gear, the sound "baa" made by a goat may be assigned as the second sound.

According to a modification of the present embodiment, when the operation of the pseudo shift lever 27 is switched, a sound (second sound) different from the sound (first sound) corresponding to the usage state of the vehicle 1 is temporarily output from the speaker 2 as the generated sound 3. Thus, the frequency of using the manual mode among the control modes is anticipated to increase. This promotes appropriate use of battery electric vehicles, which allow for enjoyment of driving in the same way as with MT vehicles.

What is claimed is:

1. A battery electric vehicle that uses an electric motor as a traction power unit, the battery electric vehicle comprising:
   one or more speakers that output sound to at least one of inside and outside of the vehicle;
   one or more processors; and
   one or more storage devices for storing usage state information of the battery electric vehicle and sound source data, wherein the usage state information includes types of information that serve as indicators of whether the battery electric vehicle is being used appropriately, and wherein the one or more processors are configured to
   estimate a fitness of the battery electric vehicle based on the usage state information, wherein the fitness of the battery electric vehicle means a degree indicating how good a condition of the vehicle is,
   generate, based on the sound source data, sound that varies as a function of the fitness, wherein the generated sound includes at least one of an increase in pressure of the sound, an increase in frequency of the sound, or a selection of sound source data with a brighter tone, corresponding to a higher fitness of the battery electric vehicle, and
   output the generated sound through the one or more speakers.

2. The battery electric vehicle according to claim 1, wherein:
   the usage state information is a frequency of use of the battery electric vehicle;
   the higher the frequency of use is, the higher the fitness is; and
   the lower the frequency of use is, the lower the fitness is.

3. The battery electric vehicle according to claim 1, wherein:
   the usage state information is cleanliness of the battery electric vehicle;
   the higher the cleanliness is, the higher the fitness is; and
   the lower the cleanliness is, the lower the fitness is.

4. The battery electric vehicle according to claim 1, wherein:
   the usage state information is a driving duration of the battery electric vehicle; and
   the fitness when the driving duration is no smaller than a threshold value is lower than the fitness when the driving duration is smaller than the threshold value.

5. The battery electric vehicle according to claim 1, wherein:
   the usage state information is an amount of charge of a battery;
   the higher the amount of charge is, the higher the fitness is; and
   the lower the amount of charge is, the lower the fitness is.

6. The battery electric vehicle according to claim 1, wherein:
   the usage state information is a frequency of cleaning the battery electric vehicle, wherein cleaning includes at least one of removing dirt on a surface of a body of the battery electric vehicle and removing trash from inside the battery electric vehicle;

the higher the frequency of cleaning the battery electric vehicle is, the higher the fitness is; and the lower the frequency of cleaning the battery electric vehicle is, the lower the fitness is.

7. The battery electric vehicle according to claim 1, wherein:

the usage state information is adequacy of maintenance of the battery electric vehicle, wherein adequacy of maintenance of the battery electric vehicle includes at least one of compliance with vehicle inspection schedules or remediation of trouble issues;

the higher the adequacy of the maintenance is, the higher the fitness is; and the lower the adequacy of the maintenance is, the lower the fitness is.

8. The battery electric vehicle according to claim 7, wherein the maintenance includes at least one of complying with vehicle inspection schedules or remedying trouble issues.

9. The battery electric vehicle according to claim 1, wherein the battery electric vehicle is equipped with a manual mode in which output of the electric motor is varied in response to driving operations of vehicle components other than an accelerator pedal or other than a brake pedal.

10. The battery electric vehicle according to claim 9, further comprising:

the accelerator pedal;

a sequential shifter; and a motor control device that controls the electric motor, wherein the motor control device is configured to vary the output of the electric motor in response to operation of the accelerator pedal when a control mode is an automatic mode, and vary output characteristics of the electric motor responding to the operation of the accelerator pedal, in response to operation of the sequential shifter, when the control mode is the manual mode.

11. The battery electric vehicle according to claim 9, further comprising:

the accelerator pedal;

a pseudo clutch pedal;

a pseudo shift device; and a motor control device that controls the electric motor, wherein the motor control device is configured to vary the output of the electric motor in response to operation of the accelerator pedal when a control mode is an automatic mode, and vary the output of the electric motor responding to the operation of the accelerator pedal, in response to operation of the pseudo clutch pedal and the pseudo shift device, when the control mode is the manual mode.

* * * * *